(12) United States Patent
Johannsen

(10) Patent No.: US 11,745,811 B2
(45) Date of Patent: Sep. 5, 2023

(54) GROUND-ENGAGING TRACK SHOE HAVING WEIGHT RELIEF CHANNEL

(71) Applicant: Caterpillar Inc., Peoria, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 17/196,448

(22) Filed: Mar. 9, 2021

(65) Prior Publication Data
US 2022/0289320 A1 Sep. 15, 2022

(51) Int. Cl.
*B62D 55/205* (2006.01)
*B62D 55/20* (2006.01)
*B62D 55/26* (2006.01)

(52) U.S. Cl.
CPC ......... *B62D 55/205* (2013.01); *B62D 55/202* (2013.01); *B62D 55/26* (2013.01)

(58) Field of Classification Search
CPC .... B62D 55/202; B62D 55/205; B62D 55/26; B62D 55/28
See application file for complete search history.

(56) References Cited

U.S. PATENT DOCUMENTS

| | | | |
|---|---|---|---|
| 1,952,545 A | 3/1934 | Gotshall | |
| 2,039,012 A | 4/1936 | Lindberg | |
| 2,549,930 A * | 4/1951 | Riegel | H05B 6/40 29/891.1 |
| 2,670,997 A * | 3/1954 | Waller | B62D 55/26 305/159 |
| 2,964,361 A | 12/1960 | Hansen | |
| 3,762,780 A * | 10/1973 | Tomizawa | B62D 55/096 305/189 |
| 3,937,529 A * | 2/1976 | Becker | B62D 55/286 305/191 |
| 8,876,227 B2 | 11/2014 | Meyer et al. | |
| 9,333,998 B2 | 5/2016 | Thorson et al. | |
| 9,446,802 B2 * | 9/2016 | Weiß | B62D 55/26 |

FOREIGN PATENT DOCUMENTS

| | | | | |
|---|---|---|---|---|
| AT | 10740 U1 * | 9/2009 | | B62D 55/18 |
| EP | 2588362 | 5/2013 | | |

OTHER PUBLICATIONS

Translation of AT 10740 U1, 8 pages (Year: 2009).*

* cited by examiner

*Primary Examiner* — S. Joseph Morano
*Assistant Examiner* — Emily G. Castonguay

(57) ABSTRACT

A ground-engaging track shoe in a track joint assembly includes a shoe plate having bolt holes extending through a middle plate section between a planar link-bolting surface and a ground-contact surface. A weight relief channel is formed in the middle plate section upon a link-bolting side of the track shoe, and extends inwardly from the planar link-bolting surface. The weight relief channel is arranged between a forward bolt hole set of the bolt holes and a back bolt hole set of the bolt holes in a fore-aft direction.

20 Claims, 3 Drawing Sheets

GROUND-ENGAGING TRACK SHOE HAVING WEIGHT RELIEF CHANNEL

TECHNICAL FIELD

The present disclosure relates generally to a ground-engaging track shoe, and more particularly to a ground-engaging track shoe having a weight relief channel.

BACKGROUND

Ground-engaging track systems are used in a variety of machines in off-highway environments. Applications include construction, mining, forestry, landfills, and various others. In a typical configuration, a plurality of track links form an endless chain that extends about rotatable track-engaging elements coupled to a machine frame. A ground-engaging track of this nature is typically provided at each of a left side and a right side of the machine. The tracks can be advanced in forward directions to move the machine forward, in reverse directions to move the machine backward, and rotated at differing speeds to turn the machine.

The off-highway environments where such track systems are used tend to be quite harsh and characterized by hard substrate materials, slippery and wet conditions, and machine applications subjecting the track systems to a variety of different types of loading. It is generally necessary for track system components to be built to be quite robust and durable. As a result, track systems, including track components themselves, are often quite heavy necessitating special handling for shipping, assembly, and service. It is advantageous or even critical for various applications for a track-type machine to be heavy, however, extreme weights ultimately can place limitations on machine performance, efficiency, and various costs associated with track-type machine ownership and operation. U.S. Pat. No. 8,876,227 to Meyer et al. is directed to a mobile machine track shoe having multiple substantially parallel grouser bars. A base is opposite a ground engaging surface, and includes reliefs disposed opposite the grouser bars. While the configuration set forth in Meyer et al. undoubtedly has various applications, there is always room for improvement and development of alternative strategies for different machine applications and different track shoe types.

SUMMARY OF THE INVENTION

In one aspect, a ground-engaging track shoe includes a shoe plate having a middle plate section extending in a lateral direction from a first lateral shoe edge to a second lateral shoe edge, and in a fore-aft direction between a front shoe edge and a back shoe edge. The shoe plate is elongated between the first lateral edge and the second lateral edge, and the middle plate section includes a planar link-bolting surface, and a ground-contact surface opposite to the planar link-bolting surface. The ground-engaging track shoe further includes bolt holes extending through the middle plate section between the planar link-bolting surface and the ground-contact surface and arranged in a forward bolt hole set and a back bolt hole set. A weight relief channel is formed in the middle plate section, and the weight relief channel extends inwardly from the planar link-bolting surface and is arranged between the forward bolt hole set and the back bolt hole set in the fore-aft direction.

In another aspect, a ground-engaging track shoe includes a shoe plate having a middle plate section extending in a lateral direction from a first lateral shoe edge to a second lateral shoe edge, and in a fore-aft direction between a front shoe edge and a back shoe edge. A grouser projects in a vertical direction from the shoe plate at a location adjacent to the back shoe edge. The middle plate section includes a ground-contact side whereupon the grouser is located, and a link-bolting side having a planar link-bolting surface extending in the fore-aft direction between the back shoe edge and the front shoe edge. A weight relief channel is formed on the link-bolting side, and the weight relief channel extends inwardly from the planar link-bolting surface and in the lateral direction between the first lateral shoe edge and the second lateral shoe edge.

In still another aspect, a track joint assembly includes a track chain assembly having two parallel chains of track links coupled together in an end-to-end arrangement, and a track shoe having a ground-contact side, and a link-bolting side in contact with track links in the track chain assembly. A bolt set bolts the track shoe to the two parallel chains of track links, and the track chain assembly and track shoe together define a footprint of bolted contact. The track shoe further includes a weight relief channel formed in the link-bolting side and extending laterally through the footprint of bolted contact.

DETAILED DESCRIPTION

Figure 1:
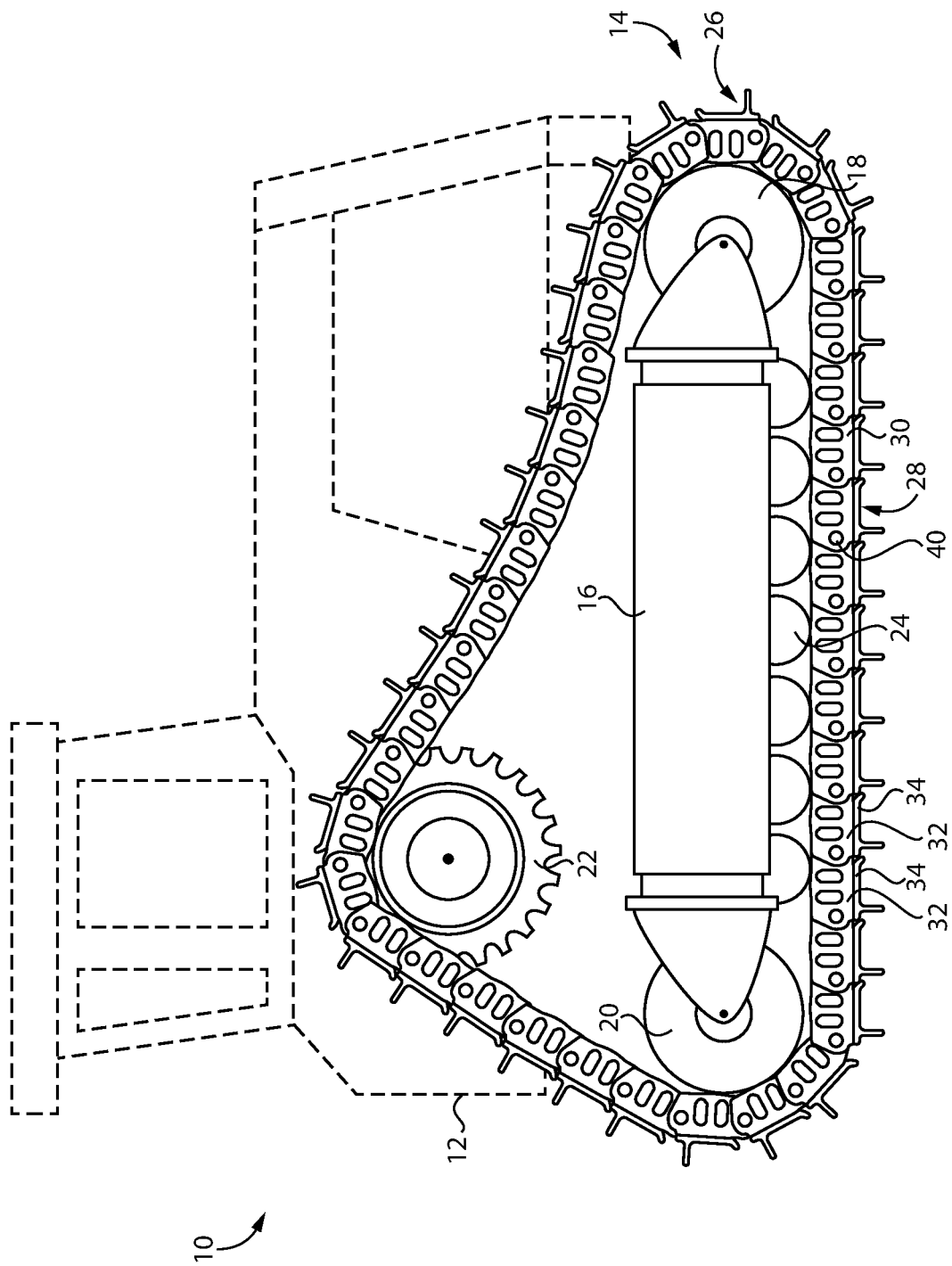
FIG. 1 is a side diagrammatic view of a machine, according to one embodiment.

Referring to FIG. 1, there is shown a machine 10, according to one embodiment. Machine 10 is shown in the context of an off-highway track-type tractor, however, a track-type loader, an excavator, a half-track machine or potentially still other machine types may fall within the scope of the present disclosure. Machine 10 includes a frame 12 and a ground-engaging track system 14 coupled to frame 12. Ground-engaging track system 14 includes a track roller frame 16, and each of a front idler 18, and a back idler 20 supported by track roller frame 16. Ground-engaging track system 14 further includes a drive sprocket 22 supported by frame 12 in a so-called "high drive" configuration. Oval track configurations having only one idler and one drive sprocket also fall within the scope of the present disclosure. Ground-engaging track system 14 further includes a plurality of track rollers 24 supported by track roller frame 16, bearing much of the weight of machine 10, and a ground-engaging track 26 extending about front idler 18, back idler 20, and drive sprocket 22. Machine 10 will typically be equipped with a substantially identical track, rotatable track-engaging elements, and other apparatus at an opposite side not visible in the view of FIG. 1.

Ground-engaging track 26 includes a track chain assembly 28 including two parallel chains of track links coupled together in an end-to-end arrangement. In FIG. 1, one track chain 30 is shown and includes track links 32. A plurality of ground-engaging track shoes 34 are attached to chain assembly 28 such as by bolting to the two parallel chains of track links. As will be further apparent from the following description, ground-engaging track shoes 34 are uniquely configured for reduced weight in comparison to certain other track shoes while maintaining an optimized strength and durability.

Figure 2:
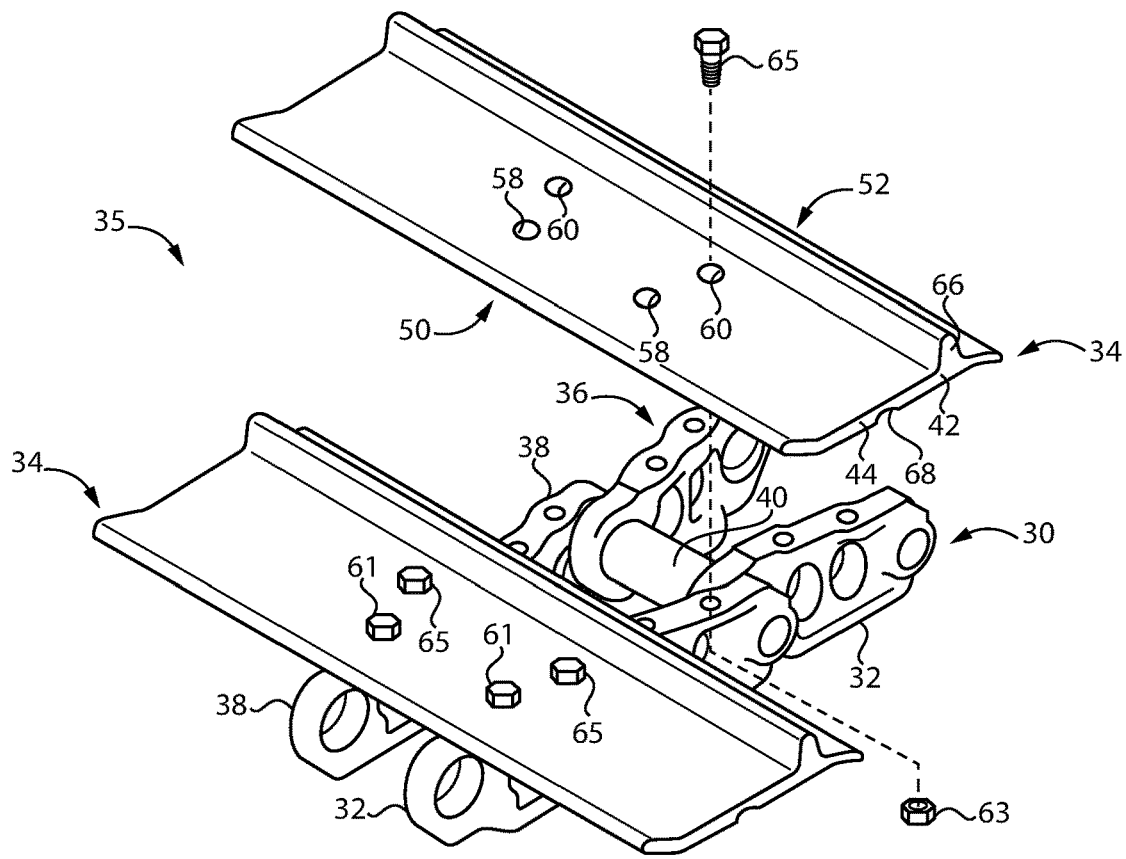
FIG. 2 is a diagrammatic view, partially disassembled, of a track joint assembly, according to one embodiment.

Referring also now to FIG. 2, there is shown a track joint assembly 35 such as may be a part of ground-engaging track 26. Track chain 30 is shown coupled to a track chain 36 by way of a pin 40. Also shown in FIG. 2 are ground-engaging track shoes 34 in greater detail. Each ground-engaging track shoe 34, hereinafter referred to at times in the singular and as "track shoe 34", includes a shoe plate 42. Shoe plate 42 includes a middle plate section 44 and may be attached to track links 32 and 38 in track chains 30 and 36 by a plurality of bolts. Bolt holes extend through middle plate section 44 and are arranged in a forward bolt hole set 58 and a back bolt hole set 60. A bolt set of bolts arranged in a forward bolt set 61 and a back bolt set 65 extend through forward bolt hole set 58 and back bolt hole set 60, respectively. One back bolt 65 is shown as it might appear positioned to be passed through one back bolt hole 60 and to be engaged with a nut 63 received in a nut seat window in one of track links 32. Bolt holes of forward bolt hole set 58 and back bolt hole set 60 may have any suitable arrangement, typically in a polygonal pattern such as the trapezoidal pattern shown, a rectangular pattern, a square pattern, or potentially still another.

Figure 3:
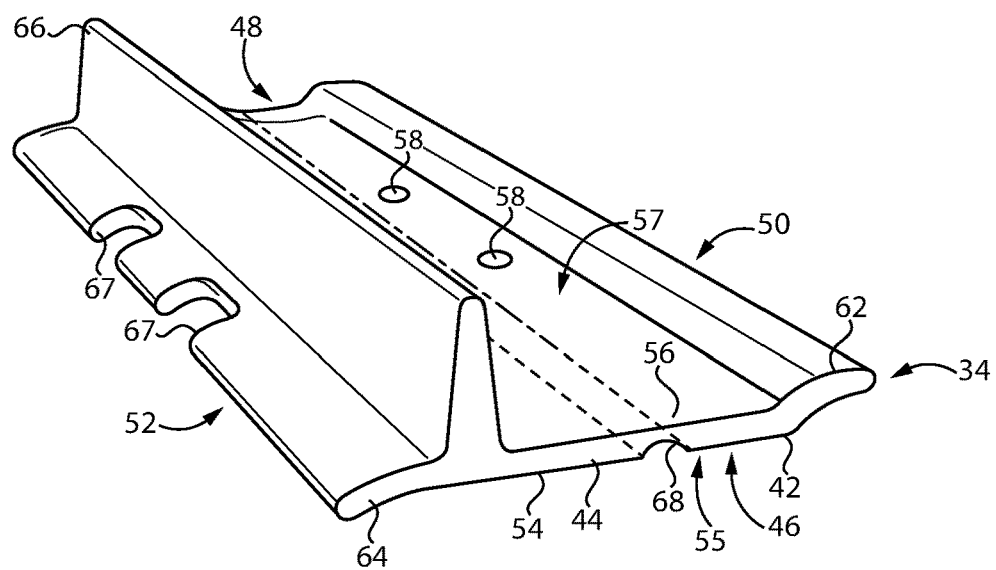
FIG. 3 is a perspective view of a ground-engaging track shoe, according to one embodiment.

Referring also to FIG. 3, as noted above, shoe plate 42 includes middle plate section 44. Middle plate section 44 extends in a lateral direction from a first lateral shoe edge 46 to a second lateral shoe edge 48, and in a fore-aft direction between a front shoe edge 50 and a back shoe edge 52. Shoe plate 42 is elongated between first lateral shoe edge 48 and second lateral shoe edge 46, as is middle plate section 44. Middle plate section 44 further includes a planar link-bolting surface 54 upon a link-bolting side 55 of track shoe 34, and a ground-contact surface 56, upon a ground-contact side 57 of track shoe 34, opposite to planar link-bolting surface 54. Ground-contact surface 56 may also be planar. Bolt holes of forward bolt hole set 58 and back bolt hole set 60 extend through middle plate section 44 between planar link-bolting surface 54 and ground-contact surface 56.

As can also be seen from the drawings, shoe plate 42 includes a front lip 62, a back lip 64, and a plurality of cutouts 67 extending inwardly from back shoe edge 52. Shoe plate 42 may be understood to have an upturned profile from middle plate section 44 to front shoe edge 50, and a downturned profile from middle plate section 44 to back shoe edge 52. A back grouser 66 is laterally extending and projects from middle plate section 44 in a vertical direction, away from ground-contact side 57. Ground-contact surface 56 may be understood to originate at back grouser 66 and extend, in the fore-aft direction, to terminate at front lip 62. Planar link-bolting surface 54 may be understood to originate at back lip 64 and extend, in the fore-aft direction, to front lip 62, thus extending between back shoe edge 52 and front shoe edge 50. The terms front, back, lateral, vertical, originating, terminating, upwardly or upturned, and downwardly or downturned, and all other directional indicators are used herein for descriptive convenience and should not be understood to require any particular arrangement, directionality or functionality of the features described. Planar link-bolting surface 54 may be understood to define a horizontal plane, and from at least one perspective directional indicators can be understood in reference to the subject horizontal plane.

A weight relief channel 68 is formed in middle plate section 44. Weight relief channel 68 extends inwardly and upwardly from planar link-bolting surface 54. Weight relief channel 68 may further be arranged between forward bolt hole set 58 and back bolt hole set 60, in the fore-aft direction. Track chain assembly 28 and track shoe 34 together can be understood to define a footprint of bolted contact. The footprint of bolted contact can be understood as the footprint or area(s) of contact between planar link-bolting surface 54 and bolting surfaces of track links 32 and 38. Weight relief channel 68 is formed in link-bolting side 55 and extends laterally through the footprint of bolted contact. In the illustrated embodiment, weight relief channel 68 extends in the lateral direction from first lateral shoe edge 46 to second lateral shoe edge 48.

Figure 4:
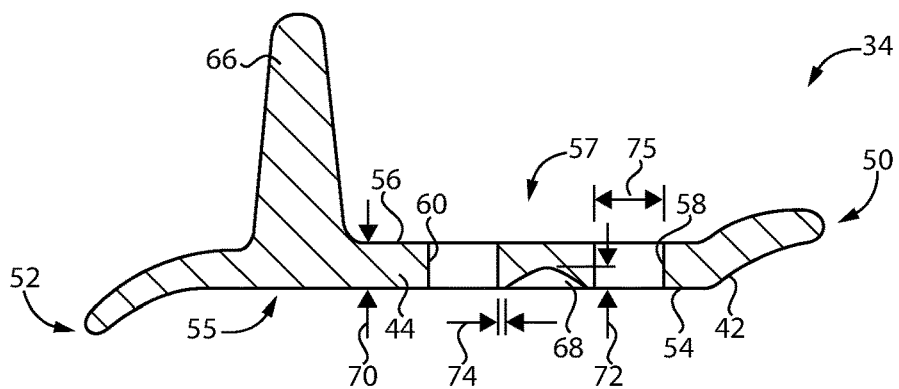
FIG. 4 is a sectioned side diagrammatic view of a ground-engaging track shoe, according to one embodiment.
Figure 5:
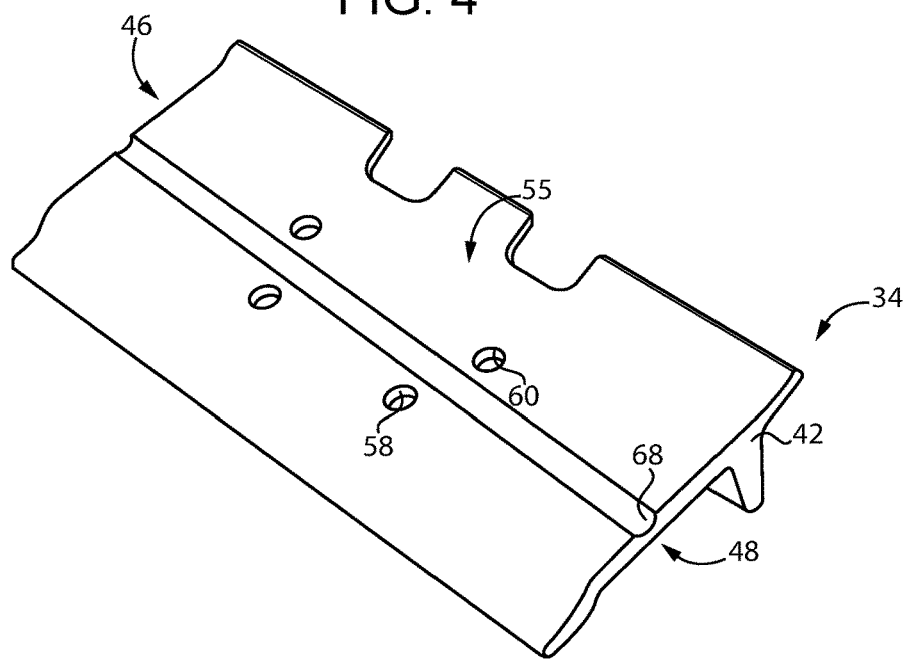
FIG. 5 is a perspective view of a ground-engaging track shoe, according to one embodiment.

Referring also now to FIGS. 4 and 5, weight relief channel 68 can be understood in at least some embodiments to divide planar link bolting surface 54 in the fore-aft direction into two similar or equal-area parts. With continued reference to FIGS. 1-5 generally, but in particular now to FIG. 4, a vertical thickness 70 of shoe plate 42 is defined between planar link-bolting surface 54 and ground-contact surface 56. In one implementation, a vertical depth 72 of weight relief channel 68 is 50% or less of vertical thickness 70. In a refinement, vertical depth 72 of weight relief channel 68 is from 25% to 50% of vertical thickness 70. Bolt holes in forward bolt hole set 58 and back bolt hole set 60 extend through middle plate section 44, and each of the respective bolt holes may define a bolt hole diameter dimension 75. Weight relief channel 68 may be located a spacing distance 74, in the fore-aft direction, from each of forward bolt hole set 58 and back bolt hole set 60 that is from 25% to 50% of bolt hole diameter dimension 75. It can thus be understood that weight relief channel 68 may be confined between forward bolt hole set 58 and back bolt hole set 60, does not directly contact or transition with either, and is spaced spacing distance 74 from each. Spacing distance 74 is shown only at one location indicating a spacing in the fore-aft direction of weight relief channel 68 from back bolt hole set 60, however, it will be understood that weight relief channel 68 may also be spaced spacing distance 74 from forward bolt hole set 58. Spacing distance 74 need not be exactly equal upon forward and back sides of weight relief channel 68 but will typically be within the range described. FIG. 4 further illustrates weight relief channel 68 having a curvilinear contour in the fore-aft direction. The curvilinear contour is parabolic in the illustrated embodiment, although the present disclosure is not thereby limited.

Figure 6:
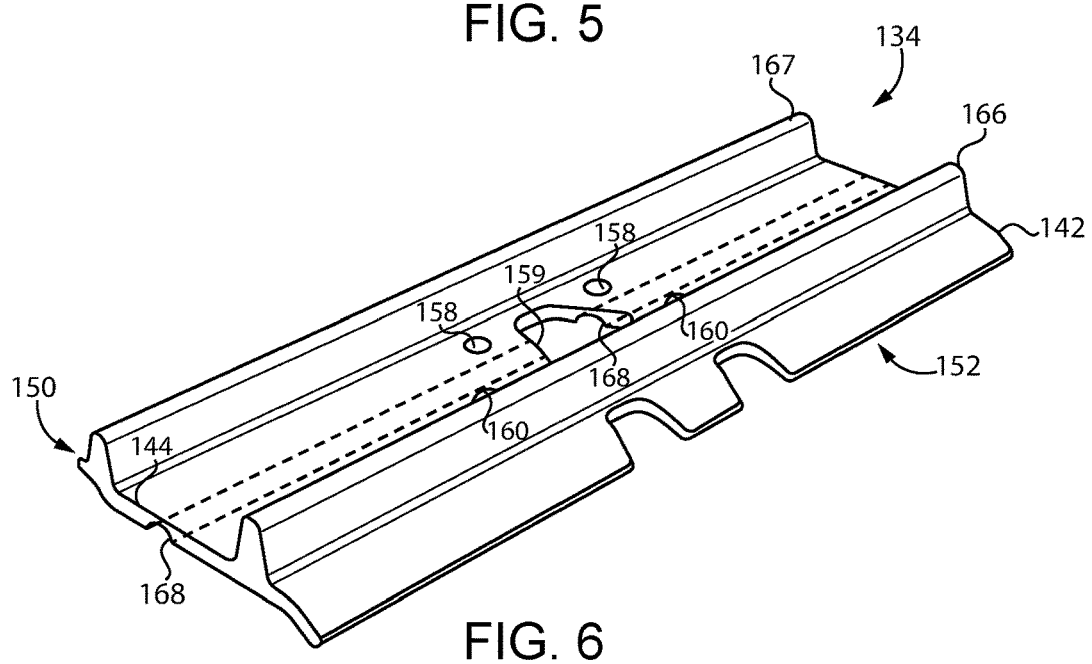
FIG. 6 is a perspective view of a ground-engaging track shoe, according to another embodiment.

Turning now to FIG. 6, there is shown a ground-engaging track shoe 134, according to another embodiment. Track shoe 134 has similarities with track shoe 34 discussed above, but certain differences. Track shoe 134 includes a shoe plate 142 having a front shoe edge 150 and a back shoe edge 152. A laterally extending back grouser is shown at 166, and is generally located and oriented analogous to grouser 66 in the embodiments described above. Track shoe 134 further includes a second or front grouser 167. Each of back grouser 166 and front grouser 167 will be understood to extend laterally between first and second lateral edges of shoe plate 142. A forward bolt hole set 158 and a back bolt hole set 160 are located between back grouser 166 and forward grouser 167 in a fore-aft direction.

Those skilled in the art will be familiar with master shoes used in connection with master links in a ground-engaging track. In the illustrated embodiment track shoe 134 includes a master shoe wherein a service window 159 is formed in a middle plate section 144. A weight relief channel 168 generally analogous to weight relief channel 68 described in the foregoing embodiments is located between back grouser 166 and front grouser 167 in the fore-aft direction and is in communication with service window 159. Analogous to other embodiments described herein, weight relief channel 168 can be understood to be located between forward bolt hole set 158 and back bolt hole set 160 in the fore-aft direction, and extends laterally through middle plate section 144, but is interrupted by service window 159. It should also be appreciated that single-grouser track shoes could be master shoes having a service window in the nature of track shoe 134. Similarly, a multiple-grouser track shoe might include a weight relief groove as in the embodiment of FIG. 6, but not be configured as a master shoe and thus not include a service window. Except as otherwise described or apparent from the context, the description herein of any one embodiment can be understood to refer by way of analogy to any other embodiment.

INDUSTRIAL APPLICABILITY

Referring to the drawings generally, and as alluded to above, reduced or optimized weight of track system components including ground-engaging track shoes can provide advantages with respect to machine speed, performance, maneuverability, or other factors. Reduced track shoe weight can also mitigate shipping costs or better enable compliance with certain shipping or packaging regulations. It should further be appreciated that the removal or reduction of material in any given part of a ground-engaging track shoe can have negative or unpredictable effects on track shoe integrity depending upon machine application, service environment, and particular location in the track shoe.

When track joint assembly 35 is assembled for service and installed in a ground-engaging track system, bolted clamping of shoe plate 42 to track links 32 and 38 provides a robust connection between the respective components that can limit the magnitude, load reaction paths, or concentration of loads, the type of loads, and exposure to wear phenomena to which the bolted clamped region of track shoe 34 is subjected. It has thus been discovered that placement and positioning, and geometric attributes of weight relief channel 68 as contemplated herein can have little, and typically zero, impact on the service life or performance of ground-engaging track system 14. It will be recalled that a vertical depth, a contour, and a fore-aft placement of weight relief channel 68 relative to bolt holes may have certain refined characteristics. It is nevertheless contemplated that weight relief channels having other relative placements, different lateral extents, different contours, than those described here in particular embodiments may still fall within the present disclosure.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ground-engaging track shoe comprising:
   a shoe plate including a middle plate section extending in a lateral direction from a first lateral shoe edge to a second lateral shoe edge, and in a fore-aft direction between a front shoe edge and a back shoe edge;
   the shoe plate is elongated between the first lateral edge and the second lateral edge, and the middle plate section includes a planar link-bolting surface, and a planar ground-contact surface opposite to the planar link-bolting surface;
   bolt holes extend through the middle plate section between the planar link-bolting surface and the planar ground-contact surface and are arranged in a forward bolt hole set and a back bolt hole set; and
   a weight relief channel is formed in the middle plate section, the weight relief channel extends inwardly from the planar link-bolting surface and is arranged between the forward bolt hole set and the back bolt hole set in the fore-aft direction, and a vertical depth of the weight relief channel extends from the weight relief channel to the planar ground-contact surface in a vertical direction and is uniform from the first lateral shoe edge to the second lateral shoe edge.

2. The track shoe of claim 1 wherein the weight relief channel extends in the lateral direction from the first lateral shoe edge to the second lateral shoe edge and divides the planar link-bolting surface in the fore-aft direction.

3. The track shoe of claim 2 wherein a vertical thickness of the shoe plate is defined between the planar link-bolting surface and the ground-contact surface, and the vertical depth of the weight relief channel is 50% or less of the vertical thickness of the shoe plate.

4. The track shoe of claim 3 wherein the vertical depth of the weight relief channel is from 25% to 50% of the vertical thickness of the shoe plate.

5. The track shoe of claim 2 wherein the weight relief channel has a curvilinear contour in the fore-aft direction.

6. The track shoe of claim 5 wherein the curvilinear contour is parabolic.

7. The track shoe of claim 2 wherein the bolt holes define a bolt hole diameter dimension, and the weight relief channel is located a spacing distance from each of the forward bolt hole set and the back bolt hole set that is from 25% to 50% of the bolt hole diameter dimension.

8. The track shoe of claim 1 wherein the shoe plate has an upturned profile from the middle plate section to the front shoe edge, and a downturned profile from the middle plate section to the back shoe edge, and further comprising a back grouser projecting from the middle plate section.

9. The track shoe of claim 8 further comprising a front grouser projecting from the middle plate section, and the forward bolt hole set and the back bolt hole set are located between the back grouser and the front grouser in the fore-aft direction.

10. A ground-engaging track shoe comprising:
    a shoe plate including a middle plate section extending in a lateral direction from a first lateral shoe edge to a second lateral shoe edge, and in a fore-aft direction between a front shoe edge and a back shoe edge;
    a grouser projecting in a vertical direction from the shoe plate at a location adjacent to the back shoe edge;

the middle plate section including a ground-contact side whereupon the grouser is located, and a link-bolting side having a planar link-bolting surface extending in the fore-aft direction between the back shoe edge and the front shoe edge;

a weight relief channel is formed on the link-bolting side, and the weight relief channel extends inwardly from the planar link-bolting surface and in the lateral direction between the first lateral shoe edge and the second lateral shoe edge; and the planar link-bolting surface is continuously planar from a location forward of the grouser to a location aft of the grouser.

11. The track shoe of claim 10 wherein the weight relief channel has a curvilinear contour in the fore-aft direction.

12. The track shoe of claim 10 wherein a vertical thickness of the shoe plate is defined between the planar link-bolting surface and a ground-contact surface, and a vertical depth of the weight relief channel is 50% or less of the vertical thickness of the shoe plate.

13. The track shoe of claim 12 wherein the vertical depth of the weight relief channel is from 25% to 50% of the vertical thickness of the track shoe.

14. The track shoe of claim 12 wherein:

bolt holes in a forward bolt hole set and a back bolt hole set extend through the middle plate section and each of the bolt holes defines a bolt hole diameter dimension; and the weight relief channel is located a spacing distance from each of the forward bolt hole set and the back bolt hole set that is from 25% to 50% of the bolt hole diameter dimension.

15. The track shoe of claim 10 wherein the shoe plate has an upturned profile from the middle shoe section to the front shoe edge, and a downturned profile from the middle plate section to the back shoe edge, and a plurality of cutouts extend inwardly from the back shoe edge.

16. The track shoe of claim 15 wherein the grouser is a back grouser, and further comprising a front grouser upon the ground-contact side, and the weight relief channel is located between the back grouser and the front grouser in the fore-aft direction.

17. The track shoe of claim 10 comprising a master shoe wherein a service window is formed in the middle plate section, and the weight relief channel is in communication with the service window.

18. A track joint assembly comprising:

a track chain assembly including two parallel chains of track links coupled together in an end-to-end arrangement;

a track shoe having a ground-contact side, and a link-bolting side in contact with track links in the track chain assembly;

a bolt set, including a forward bolt set and a back bolt set, bolting the track shoe to a first track link in a first one of the two parallel chains of track links and to a second track link in a second one of the two parallel chains of track links, and the ground-contact side is continuously planar in a fore-aft direction between the forward bolt set and the back bolt set; and the track chain assembly and track shoe together defining a footprint of bolted contact between the track shoe and each of the first track link and the second track link, and the track shoe further including a weight relief channel formed in the link-bolting side and extending laterally through the footprint of bolted contact and arranged between the forward bolt set and the back bolt set.

19. The track joint assembly of claim 18 wherein:

the weight relief channel extends between a first lateral edge of the track shoe and a second lateral edge of the track shoe and is arranged between the forward bolt set and the back bolt set in a fore-aft direction; and the weight relief channel has a curvilinear contour in the fore-aft direction.

20. The track joint assembly of claim 18 wherein:

the track shoe includes a shoe plate having a ground-contact surface upon the ground-contact side, and a link-bolting surface upon the link-bolting side;

a vertical thickness of the shoe plate is defined between the link-bolting surface and the ground-contact surface, and a vertical depth of the weight relief channel is 50% or less of the vertical thickness of the shoe plate;

bolt holes receiving the bolt set extend through the shoe plate between the ground-contact surface and the link-bolting surface, and each of the bolt holes defines a bolt hole diameter dimension; and the weight relief channel is located a spacing distance from each of the forward bolt hole set and the back bolt hole set that is from 25% to 50% of the bolt hole diameter dimension.

\* \* \* \* \*